(12) United States Patent
Zhang et al.

(10) Patent No.: US 12,488,875 B1
(45) Date of Patent: Dec. 2, 2025

(54) TARGETED CONTROL METHOD AND SYSTEM FOR BLACKHEAD REMOVAL (71) Applicant: Guangzhou Shifei Bio-Tech Co., Ltd., Guangzhou (CN)

(72) Inventors: Shenjun Zhang, Guangzhou (CN); Xiangjun Ren, Guangzhou (CN)

(73) Assignee: Guangzhou Shifei Bio-Tech Co., Ltd., Guangzhou (CN)

(*) Notice: Subject to any disclaimer, the term of this patent is extended or adjusted under 35 U.S.C. 154(b) by 0 days.

(21) Appl. No.: 19/206,130

(22) Filed: May 13, 2025

(30) Foreign Application Priority Data

May 29, 2024 (CN) .......................... 202410677125.1

(51) Int. Cl.
*G16H 20/90* (2018.01)
*A61B 5/00* (2006.01)

(52) U.S. Cl.
CPC ............ G16H 20/90 (2018.01); *A61B 5/0075* (2013.01); *A61B 5/443* (2013.01); *A61B 5/444* (2013.01); *A61B 5/4848* (2013.01)

(58) Field of Classification Search
CPC ...... G16H 20/30; A61B 5/0075; A61B 5/443; A61B 5/444; A61B 5/4848
USPC ........................................................ 705/2–3
See application file for complete search history.

(56) References Cited

U.S. PATENT DOCUMENTS

| | | | |
|---|---|---|---|
| 12,086,986 B2 * | 9/2024 | Maclellan | G16H 20/00 |
| 12,324,679 B1 * | 6/2025 | Lochner | A61B 5/0079 |
| 12,324,680 B1 * | 6/2025 | Lochner | A61B 5/444 |
| 2009/0196475 A1 * | 8/2009 | Demirli | G06V 40/162 |
| | | | 382/128 |
| 2010/0185064 A1 * | 7/2010 | Bandic | A61B 5/444 |
| | | | 600/306 |
| 2017/0246473 A1 * | 8/2017 | Marinkovich | G16H 30/40 |
| 2018/0106676 A1 * | 4/2018 | Jang | A61B 5/441 |
| 2018/0150896 A1 * | 5/2018 | Parkkinen | G06Q 30/0271 |
| 2019/0237194 A1 * | 8/2019 | Salvi | G06N 5/04 |
| 2019/0303991 A1 * | 10/2019 | Ford | A61K 8/9789 |
| 2020/0265937 A1 * | 8/2020 | Anyanwu-Ofili | G06N 5/04 |
| 2021/0174965 A1 * | 6/2021 | Thubagere Jagadeesh | |
| | | | G06T 7/90 |
| 2022/0110581 A1 * | 4/2022 | Thubagere Jagadeesh | |
| | | | A61B 5/441 |
| 2022/0225927 A1 * | 7/2022 | Yoo | A61B 5/441 |

(Continued)

FOREIGN PATENT DOCUMENTS

| | | | | |
|---|---|---|---|---|
| CN | 114219868 A | * | 3/2022 | ............... G06N 3/04 |
| CN | 118016231 A | * | 5/2024 | ....... G06F 18/24323 |

*Primary Examiner* — Michael Tomaszewski
(74) *Attorney, Agent, or Firm* — Bayramoglu Law Offices LLC (57) ABSTRACT A targeted control method for blackhead removal includes steps of: collecting spectral response data of skin surfaces of users based on a spectral imaging technology, analyzing sebum contents and a pore states, identifying skin areas with blackheads and clogged pores, and obtaining spectral data analysis results. In the targeted control method for blackhead removal, the spectral response data of the skins of the users is collected and analyzed, and the sebum contents and the pore states of the skins of the users are evaluated, which optimizes an accuracy of identifying the skin areas with blackheads and clogged pores, correlation between sebum distributions and effects of a plurality of blackhead removal products is analyzed, which helps users make scientific decisions on product selection and use solutions.

8 Claims, 8 Drawing Sheets

(56) References Cited

U.S. PATENT DOCUMENTS

| | | | |
|---|---|---|---|
| 2023/0298300 A1* | 9/2023 | He | G06V 20/64 348/77 |
| 2023/0419370 A1* | 12/2023 | Park | G06T 7/90 |
| 2024/0108278 A1* | 4/2024 | McGill | A61B 5/0077 |
| 2025/0166040 A1* | 5/2025 | Dissanayake | G16H 50/20 |
| 2025/0166175 A1* | 5/2025 | Kohlmann | A61K 8/737 |

\* cited by examiner

TARGETED CONTROL METHOD AND SYSTEM FOR BLACKHEAD REMOVAL

CROSS-REFERENCE TO THE RELATED APPLICATIONS

This application is based upon and claims priority to Chinese Patent Application No. 202410677125.1, filed on May 29, 2024, the entire contents of which are incorporated herein by reference.

TECHNICAL FIELD

The present disclosure relates to the field of skin care technology, and in particular, to a targeted control method and a system for blackhead removal.

BACKGROUND

The field of skin care technology aims to develop methods and products for improving and caring human skins, including various techniques such as cleansing, nourishing, sparing, and recovery, and including daily care products such as cleansers and moisturizing creams, and professional treatment products such as anti-aging, pox treatment, and pigmentation adjustment products, and to figure out solutions adapting to various skin types and solve target skin problems with chemical, biological, and engineering knowledge.

A targeted control method for blackhead removal is a treatment method for removing facial blackheads, which removes sebum and keratinous clogged in pores, to reduce and control blackheads, improve skin texture, reduce skin problems, and make skins cleaner and healthier. Specific chemical ingredients, including substances that can dissolve sebum and soften keratinous are used, to ensure that the active substances can act directly on blackhead formation sites, which effectively removes blackheads and prevents regeneration of blackheads. This provides an effective skin care solution for various users, including users with high levels of facial sebum and easily clogged pores, providing deep cleansing and long-term care for skins.

Conventional blackhead removal methods do not provide sufficient skin care and real-time monitoring for various users, and deal with blackhead and skin problems based on common treatment regimens, which cannot adapt to various skin properties and impact of individual living environment. The shortage in continuous monitoring of skin changes causes a failure in reflecting in real time changes in skin states caused by environmental changes and lifestyle changes, resulting in poor treatment outcomes and repeated adjustments of treatment regimens. For example, a product use frequency and a category matching change cannot be effectively adjusted when seasonal changes and environmental pollution affect secretion of sebum from user skins, which results in degraded treatment outcomes and worsened skin problems.

SUMMARY

The present disclosure is intended to resolve disadvantages of the prior art, and provides a targeted control method and system for blackhead removal.

In order to achieve the above objective, the present disclosure adopts the following technical solution. A targeted control method for blackhead removal includes the following steps:

S1: collecting spectral response data of skin surfaces of users based on a spectral imaging technology, analyzing sebum contents and pore states, identifying skin areas with blackheads and clogged pores, and obtaining spectral data analysis results;

S2: analyzing skin and pore states of a plurality of users based on the spectral data analysis results, identifying skin types of target users, and generating skin type identification information;

S3: analyzing sebum distributions and pH values of a plurality of skin types based on the skin type identification information, classifying the skin types, and analyzing a correlation between sebum distributions, pH values and historical cleansing product effects, to obtain cosmetic product evaluation information;

S4: identifying key factors affecting cleansing effects based on the cosmetic product evaluation information, analyzing correlation between cleansing products and biomarkers, identifying performance of a plurality of cleansing products on different skin types, and generating product adaptability evaluation results;

S5: analyzing lifestyles and environmental factors of the users based on the product adaptability evaluation results, calculating pore purification cycles of the plurality of users in combination with the skin types of the users, and generating user pore care processes; and S6: collecting real-time skin state data of the users based on the user pore care processes, adjusting selected cleansing products and use frequencies, and generating user blackhead cleansing cycles.

In a further solution of the present disclosure, the spectral data analysis results include sebum profiles, pore state indexes, and blackhead distribution areas, the skin type identification information specifically includes water and sebum balance information, elasticity rating scores, and a comprehensive sensitivity evaluation results of user skins, the cosmetic product evaluation information includes sebum distribution data corresponding to the plurality of skin types, pH value information corresponding to the plurality of skin types, and cleansing product reaction correlation analysis results, the product adaptability evaluation results specifically include effect comparisons of skin types corresponding to a plurality of products, cleansing effects at various pH values, correlation analysis result of products and sebum distributions, the user pore care process includes a regular deep cleansing schedule, recommended skin care products, and suggestions on environmental factor adjustment, and the user blackhead cleansing cycle specifically includes cleansing frequency adjusted based on skin state changes, suggestions on product replacement, and blackhead prevention measures.

In a further solution of the present disclosure, the step of collecting the spectral response data of the skin surfaces of the users based on the spectral imaging technology, analyzing the sebum contents and the pore states, identifying the skin areas with blackheads and clogged pores, and obtaining the spectral data analysis results specifically includes:

S101: collecting the spectral response data of the skin surfaces of the users based on the spectral imaging technology, recording spectral intensities and wavelength changes, and generating the spectral response data;

S102: identifying spectral bands representing the sebum contents and the pore states based on the spectral response data, and analyzing and recording peak intensities and peak wave widths of target wavebands, to obtain sebum and pore characteristic data; and S103: identifying, from the sebum and pore characteristic data, areas with sebum accumulation and pore expansion and blackhead locations of skins through comparison of user skin spectral characteristics, and generating the spectral data analysis results.

In a further solution of the present disclosure, the step of analyzing the skin and pore states of the plurality of users based on the spectral data analysis result, identifying the skin types of the target users, and generating the skin type identification information specifically includes:

S201: analyzing sebum levels and pore states of the skin surfaces of the users based on the spectral data analysis result, and grouping the skin types of the plurality of users, to obtain skin characteristic classification data;

S202: performing matching degree analysis based on the skin characteristic classification data and historical skin data information, and identifying the skin types of the target users, to obtain user skin matching results; and S203: analyzing the skin types of the plurality of users by using the user skin matching result, identifying key characteristics of the skin types of the users, the key characteristics including sebum content indicators, moisture retention capability, and a spectral reflectance characteristic, and generating the skin type identification information.

In a further solution of the present disclosure, the step of analyzing the sebum distributions and the pH values of the plurality of skin types based on the skin type identification information, classifying the skin types, and analyzing the correlation between the sebum distribution, the pH values and the historical cleansing product effects, to obtain the cosmetic product evaluation information specifically includes:

S301: collecting and recording sebum distribution and pH value data of the plurality of skin types based on the skin type identification information, and generating sebum and pH data record;

S302: comparing the collected data with a historical cleansing product effect database based on the sebum and pH data record, and analyzing correlation between user skin characteristics and effects of a plurality of cleansing products, to obtain cleansing correlation analysis results; and S303: analyzing impacts of sebum distributions and pH values on effects of a plurality of blackhead removal products based on the cleansing correlation analysis result, evaluating impact of the plurality of products on different user skins, and generating the cosmetic product evaluation information.

In a further solution of the present disclosure, the step of identifying the key factors affecting the cleansing effects based on the cosmetic product evaluation information, analyzing the correlation between the cleansing products and the biomarkers, identifying the performance of the plurality of cleansing products on the different skin types, and generating the product adaptability evaluation result specifically includes:

S401: analyzing effects of the plurality of cleansing products on the different skin types based on the cosmetic product evaluation information, the effects including product adaptability and efficiency, and generating cleansing effect difference data;

S402: analyzing key biomarkers affecting cleansing effects through comparison with biomarker data based on the cleansing effect difference data, and generating key biomarker analysis results; and S403: evaluating adaptabilities of the plurality of cleansing products on the different skin types based on the key biomarker analysis results, and generating the product adaptability evaluation results in combination with interaction between the cleansing products and the biomarkers.

In a further solution of the present disclosure, the step of analyzing the lifestyles and the environmental factors of the users based on the product adaptability evaluation result, calculating the pore purification cycles of the plurality of users in combination with the skin types of the users, and generating the user pore care processes specifically includes:

S501: collecting lifestyle data of the users based on the product adaptability evaluation results, the lifestyle data including sleep modes, dietary habits, and daily activity intensities of the users, evaluating impact of environmental factors and lifestyles on skin types, and generating lifestyle analysis results;

S502: calculating pore purification demand frequencies of the plurality of users based on the lifestyle analysis results, the skin types of the users, and impact of seasonal changes and activity levels, and generating pore purification cycle plans; and S503: selecting skin care products and use frequencies for the users based on the pore purification cycle plans in combination with performance of the cleansing products and user feedbacks, and generating the user pore care processes.

In a further solution of the present disclosure, the step of collecting the real-time skin state data of the users based on the user pore care processes, adjusting the selected cleansing products and the use frequencies, and generating the user blackhead cleansing cycle specifically includes:

S601: regularly measuring and recording skin states of the users based on the user pore care processes, the skin states including skin humidities and sebum levels, and generating skin state monitoring data; and S602: analyzing change trends in the skin states of the users by using a seasonal autoregressive synthetic moving average model based on the skin state monitoring data in combination with historical user skin data, and generating skin change trend analysis results, the seasonal autoregressive synthetic moving average model calculating the change trends in the skin states of the users based on the following formula:

$$X_t = c + \epsilon_t + \sum_{i=1}^{p} \phi_i X_{t-i} + \sum_{I=1}^{q} \theta_I \epsilon_{t-I} + S_t + H_t + E_t,$$

where t is a current time point, i is a time interval before the current time t, I is a time interval for indexing of a past error term, t-i indicates a historical time point traced back from the current time t by i time units in an autoregressive part, t-I indicates a historical error time point traced back from the current time t by I time units in a moving average part, $X_t$ is a skin state at the time t, c is a constant term, $\epsilon_t$ is a white noise error term at the time t, p is an order of the autoregressive part, $\phi_i$ is an $i^{th}$ autoregressive coefficient, $X_{t-i}$ is a skin state at the time t-i, q is an order of the moving average part, $\theta_I$ is an $I^{th}$ moving average coefficient, $\epsilon_{t-I}$ is a white noise error term at the time t-I, $S_t$ is a seasonal adjustment factor at the time t, $H_t$ is a skin humidity index at the time t, and $E_t$ is impact of an external environmental factor at the time t; and S603: evaluating a degree of matching between a current cleansing product and use frequencies and the skin states of the users based on the skin change trend analysis results, adjusting the cleansing cycles and recommended cleansing product types, and generating the user blackhead cleansing cycles.

A targeted control system for blackhead removal is provided, which is configured to perform the above targeted control method for blackhead removal. The system includes:

a skin identification module, configured to collect spectral response data of skin surfaces of users based on a spectral imaging technology, and analyze sebum contents and pore states, identify skin types of the users, to obtain user skin property analysis results;

a sebum and pH analysis module, configured to analyze sebum distributions and pH values of a plurality of skins based on the user skin property analysis results, classify skin types of a plurality of users, evaluate a correlation between sebum distributions, pH values and historical effects of a plurality of products, and generate cleansing effect analysis results;

a product adaptability evaluation module, configured to identify key factors affecting a cleansing effect based on the cleansing effect analysis results, analyze correlation between cleansing products and biomarkers, and identify performance of a plurality of cleansing products on different skin types, to obtain product effect adaptability indexes;

a pore care process module, configured to analyze lifestyles and environmental factors of the users based on the product effect adaptability indexes, calculate pore purification cycles in combination with the skin types of the users, and generate skin pore cleansing processes; and a skin cleansing cycle module, configured to collect real-time skin state data of the users based on the skin pore cleansing processes, adjust selected cleansing products and use frequencies, and generate a user blackhead cleansing cycles.

Advantages and positive effects of the present disclosure compared to the prior art lie in the following:

In the present disclosure, the spectral response data of the skins of the users is collected and analyzed, and the sebum contents and the pore states of the skins of the users are evaluated, which improves accuracy of identifying blackheads and clogged pores. Correlation between the sebum distributions and effects of a plurality of blackhead removal products is analyzed, which helps users make more scientific decisions on product selection and use solutions, and lifestyles and environmental factors of the users are continuously monitored and analyzed, and selected cleansing products and use frequencies are adjusted in combination with skin types, to optimize skin care processes of the users, which improves cleansing results and achieves long-term skin health.

DETAILED DESCRIPTION OF THE EMBODIMENTS

In order to make objectives, technical solutions, and advantages of the present disclosure clearer, the present disclosure is described in further detail below with reference to drawings and embodiments. It should be understood that, specific embodiments described herein are merely used for explaining the present disclosure, and are not used for limiting the present disclosure.

It should be noted that, in the description of the present disclosure, orientation or position relationships indicated by terms "length", "width", "up", "down", "front", "back", "left", "right", "vertical", "horizontal", "top", "bottom", "inside", and "outside" are based on orientation or position relationships shown in the drawings, and are merely used for convenience of describing the present disclosure and simplifying the description, rather than indicating or implying that an indicated apparatus or element needs to have a specific orientation or be constructed and operated in a specific orientation, and therefore cannot be understood as a limitation on the present disclosure. In addition, in the description of the present disclosure, "a plurality of" means two or more, unless expressly and specifically defined otherwise.

Embodiment 1

Figure 1:
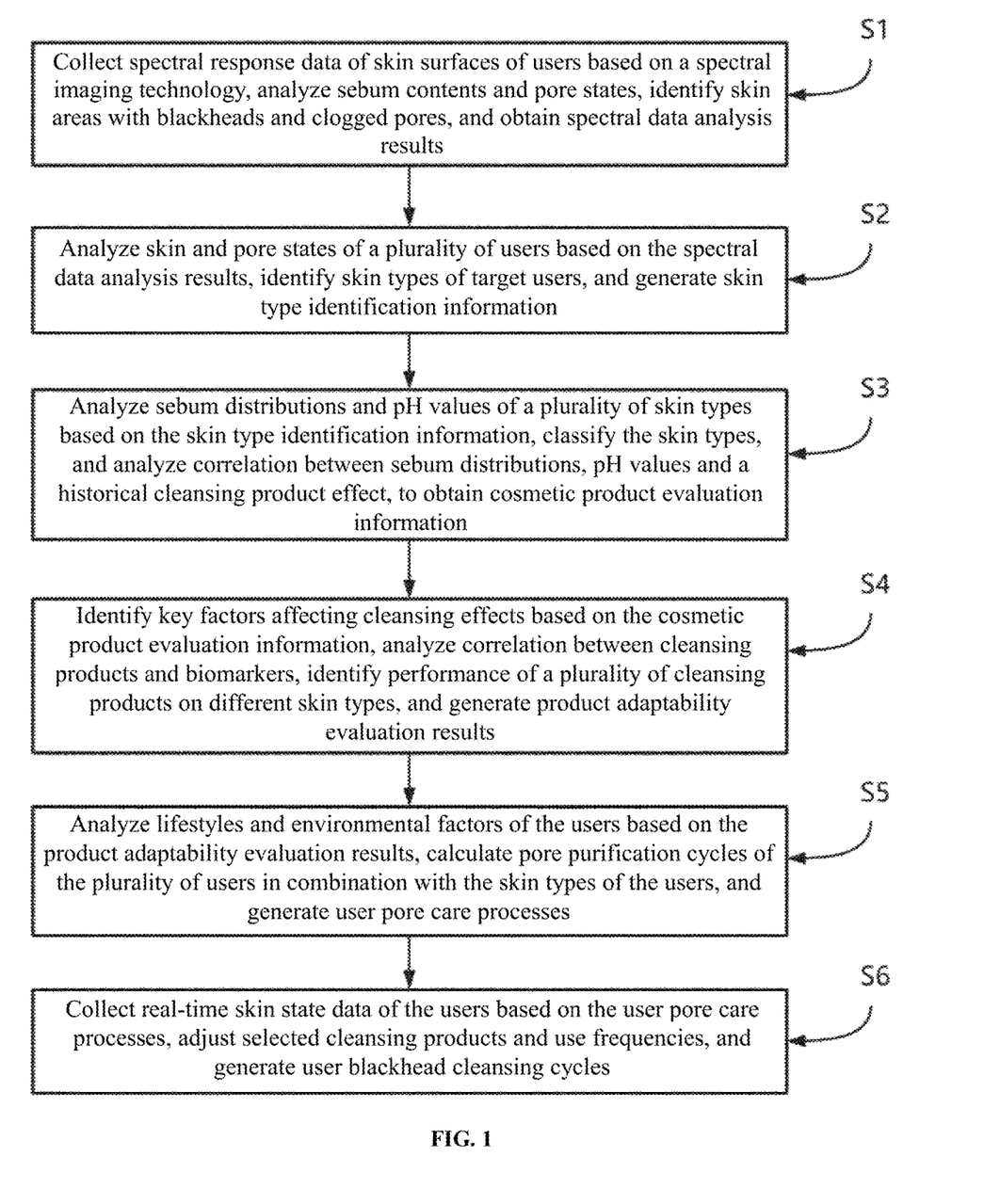
FIG. 1 is a schematic diagram of a working process according to the present disclosure.

Referring to FIG. 1, the present disclosure provides a technical solution, i.e., a targeted control method for blackhead removal, including the following steps:

S1: Collecting spectral response data of skin surfaces of users based on a spectral imaging technology, analyzing sebum contents and pore states, identifying skin areas with blackheads and clogged pores, and obtaining spectral data analysis results;

S2: Analyzing skin and pore states of a plurality of users based on the spectral data analysis results, identifying skin types of target users, and generating skin type identification information;

S3: Analyzing sebum distributions and pH values of a plurality of skin types based on the skin type identification information, classifying the skin types, and analyzing correlation between sebum distributions, pH values and historical cleansing product effects, to obtain cosmetic product evaluation information;

S4: Identifying key factors affecting cleansing effects based on the cosmetic product evaluation information, analyzing correlation between cleansing products and biomarkers, identifying performance of a plurality of cleansing products on different skin types, and generating product adaptability evaluation results;

S5: Analyzing lifestyles and environmental factors of the users based on the product adaptability evaluation results, calculating pore purification cycles of the plurality of users in combination with the skin types of the users, and generating user pore care processes; and S6: Collecting real-time skin state data of the users based on the user pore care processes, adjusting selected cleansing products and use frequencies, and generating user blackhead cleansing cycles.

The spectral data analysis results includes sebum profiles, pore state indexes, and blackhead distribution areas, the skin type identification information specifically includes water and sebum balance information of user skins, elasticity rating scores, and comprehensive sensitivity evaluation results, the cosmetic product evaluation information includes sebum distribution data corresponding to the plurality of skin types, pH value information corresponding to the plurality of skin types, and cleansing product reaction correlation analysis results, the product adaptability evaluation results specifically includes effect comparisons of skin types corresponding to a plurality of products, cleansing effects at various pH values, correlation analysis results of products and sebum distributions, the user pore care processes include regular deep cleansing schedules, recommended skin care product types, suggestions on environmental factor adjustment, and the user blackhead cleansing cycles specifically include cleansing frequency adjustments based on skin state changes, suggestions on product replacement, and blackhead reforming prevention measures.

Figure 2:
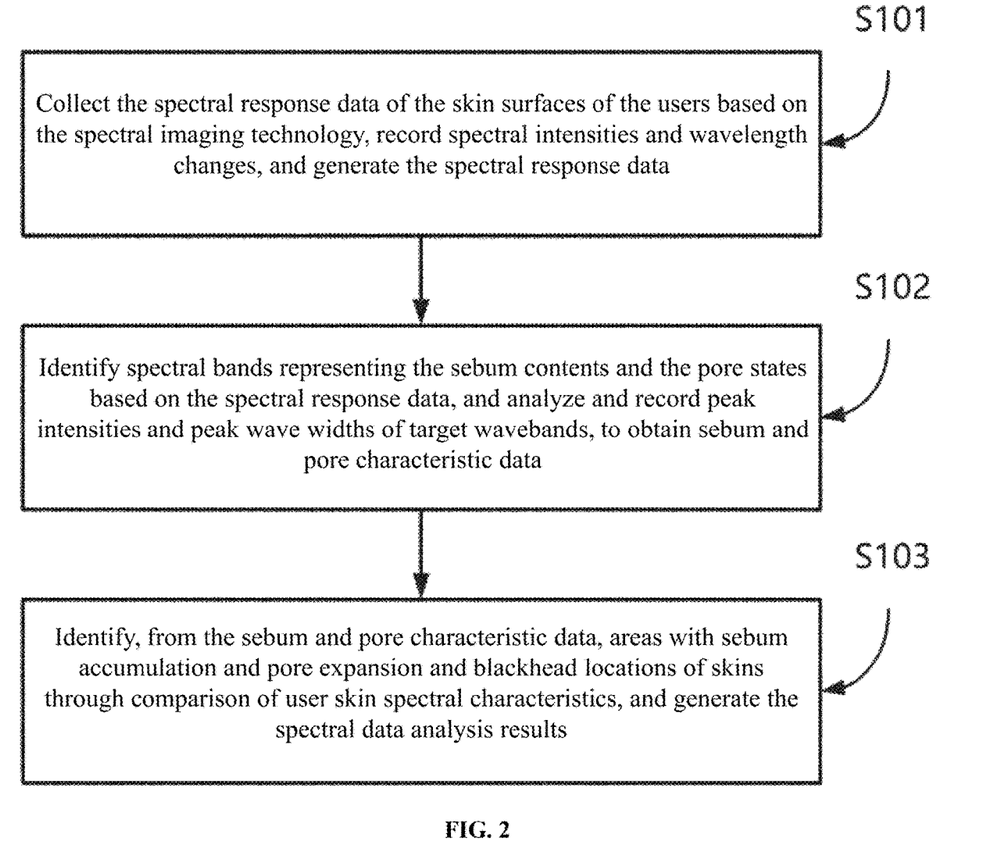
FIG. 2 is a detailed flowchart of S1 according to the present disclosure.

Referring to FIG. 2, the step of collecting the spectral response data of the skin surfaces of the users based on the spectral imaging technology, analyzing the sebum contents and the pore states, identifying the skin areas with blackheads and clogged pores, and obtaining the spectral data analysis results specifically includes the following steps S101 to S103:

S101: The spectral response data of the skin surfaces of the users based on the spectral imaging technology is collected, spectral intensities and wavelength changes are recorded, and the spectral response data is generated;

In the sub-step S101, based on the spectral imaging technology, skins of the users are irradiated with a light source, and reflection spectra are collected by using a spectrometer. A spectral intensity of each wavelength is recorded in real time, and statistical data of a wavelength change is analyzed, to accurately capture subtle skin surface responses. Data precision is optimized by adding sample points to be measured and using a calibration algorithm, so as to improve accuracy and reproducibility of data collection. A spectral response is calculated by using an improved spectral response intensity calculation formula:

$$I(\lambda) = \frac{I_0(\lambda) \cdot R(\lambda)}{S(\lambda)},$$

where $I(\lambda)$ is a spectral response intensity at a wavelength $\lambda$, $I_0(\lambda)$ is an incident light intensity, $R(\lambda)$ is a reflection coefficient, and $S(\lambda)$ is a system response function, and spectral response data is generated.

S102: Spectral bands representing the sebum contents and the pore states are identified based on the spectral response data, and peak intensities and peak wave widths of target wavebands are analyzed and recorded, to obtain sebum and pore characteristic data.

In the sub-step S102, target wavelength ranges are selected by using a spectroscopic analysis tool based on the spectral response data, wavelengths corresponding to spectral characteristics of sebum and pores of the skins; by using a peak detection algorithm, peak intensities of target wave bands are located and the peak wave widths are calculated, and the sebum contents and the pore states are identified. A formula for calculating characteristic values of the target bands is $$F(\lambda) = \frac{A(\lambda)}{W(\lambda)}.$$

C, where $F(\lambda)$ is a characteristic value of a wavelength $\lambda$, $A(\lambda)$ is a peak intensity, $W(\lambda)$ is peak wave width, and C is a correction factor for adjusting a measurement deviation to improve reliability of results and to obtain the sebum and pore characteristic data.

S103: Based on the sebum and pore characteristic data, areas with sebum accumulation and pore expansion and blackhead locations of skins through comparison of user skin spectral characteristics are identified, and the spectral data analysis results are generated as follows:

In the sub-step S103, sebum accumulation and pore expansion states in different areas are identified through comparative analysis based on the sebum and pore characteristic data, skin states are classified through an area segmentation algorithm, the blackhead positions are identified through comparison with a standard spectral database, skin state indexes are calculated by using a formula $$S_i = \sum_{j=1}^{n} \left(\frac{O_j}{T_j}\right),$$

where $S_i$ is a skin state index, $O_j$ is an observed sebum or pore outlier, $T_j$ is a typical value of an area, and n is a total number of areas in consideration, and sebum and pore states in different areas are evaluated, to generate the spectral data analysis results.

Figure 3:
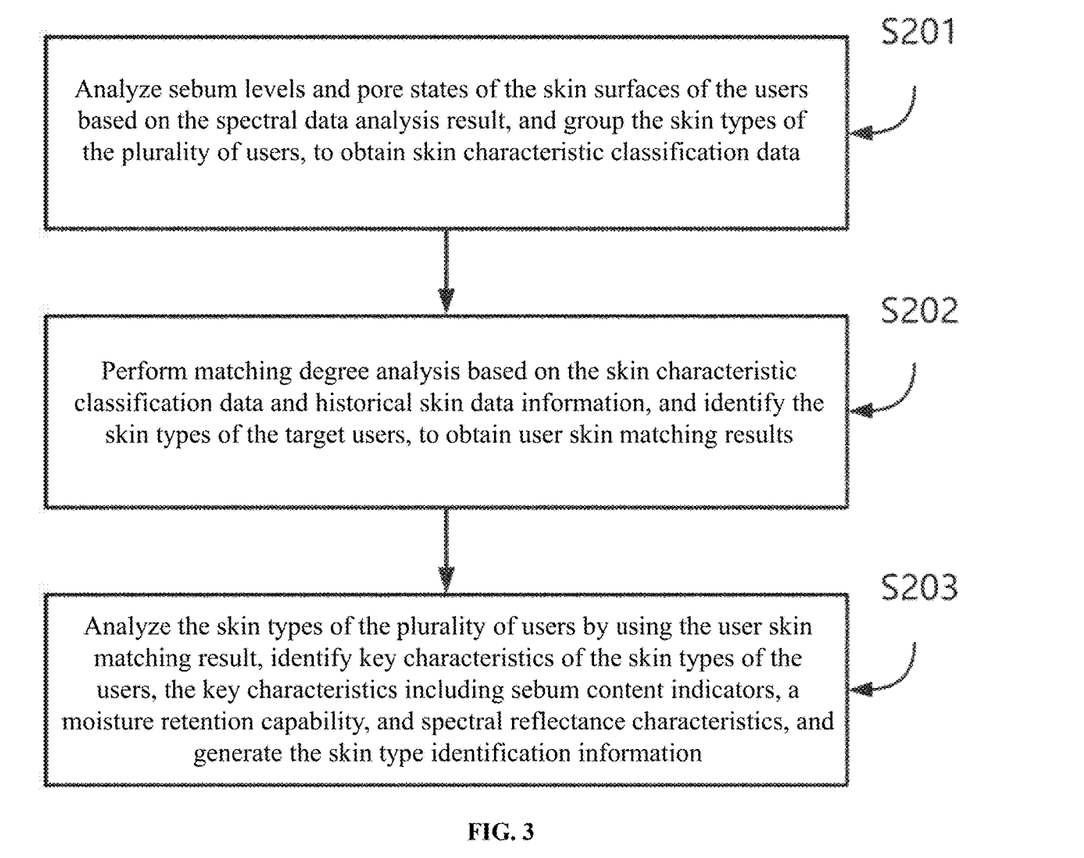
FIG. 3 is a detailed flowchart of S2 according to the present disclosure.

Referring to FIG. 3, the step of analyzing the skin and pore states of the plurality of users based on the spectral data analysis results, identifying the skin types of the target users, and generating the skin type identification information specifically includes the following steps S201 to S203:

S201: The skin types of the plurality of users are grouped by analyzing sebum levels and pore states of the skin surfaces of the users based on the spectral data analysis results, to obtain skin characteristic classification data as follows.

In the sub-step S201, the sebum levels and the pore states of the skin surfaces of the users are analyzed by using a statistical clustering algorithm based on the spectral data analysis results, the skins of the users are grouped through clustering analysis based on the same characteristics, to determine characteristics of different skin types, and an average characteristics of user skin types in a plurality of clusters are identified through a clustering analysis formula $$C_k = \frac{1}{N_k} \sum_{i=1}^{N_k} X_{ki},$$

to obtain the skin characteristic classification data, where $C_k$ is a clustering center of a $k^{th}$ cluster of skin, $N_k$ is the number of users belonging to the $k^{th}$ cluster, and $X_{ki}$ is a feature vector of an $i^{th}$ user belonging to the $k^{th}$ cluster.

S202: Matching degree analysis is performed based on the skin characteristic classification data and historical skin data information, to identify the skin types of the target users and obtain user skin matching results as follows.

In the sub-step S202, comparison analysis is performed by using the historical skin data information based on the skin characteristic classification data to improve matching accuracy, degrees of fitting with historical records are calculated, cosine values between vectors are where X and Y respectively calculated by using a cosine similarity formula $$\cos(\theta) = \frac{X \cdot Y}{\|X\|\|Y\|},$$

where X and Y respectively represent skin characteristic vector and a historical data characteristic vector of a target user, to evaluate degrees of matching between the vectors, to assist in identifying the skin types of the target users, so as to obtain the user skin matching results.

S203: The skin types of the plurality of users are analyzed by using the user skin matching results, to identify key characteristics of the skin types of the users and generate the skin type identification information, where the key characteristics include sebum content indicators, moisture retention capability, and spectral reflectance characteristics as follows.

In the sub-step S203, key characteristics of a plurality of user skin types are analyzed by using the user skin matching results; and correlation between various characteristics (including sebum content indicators, moisture retention capability, and spectral reflectance characteristics) and skin types are evaluated through multivariate regression analysis. By using a multivariate regression formula $P=\beta_0+\beta_1X_1+\beta_2X_2+\beta_3X_3+\epsilon$, where P is a skin type prediction value, $X_1$, $X_2$, and $X_3$ are respectively a sebum content index, moisture retention capability, and a spectral reflectance characteristic, the term $\beta$ is regression coefficients of each characteristic, and $\epsilon$ is an error term, the skin types of the users are calculated and predicted, and the key characteristics are identified based on results of the prediction, to generate the skin type identification information.

Figure 4:
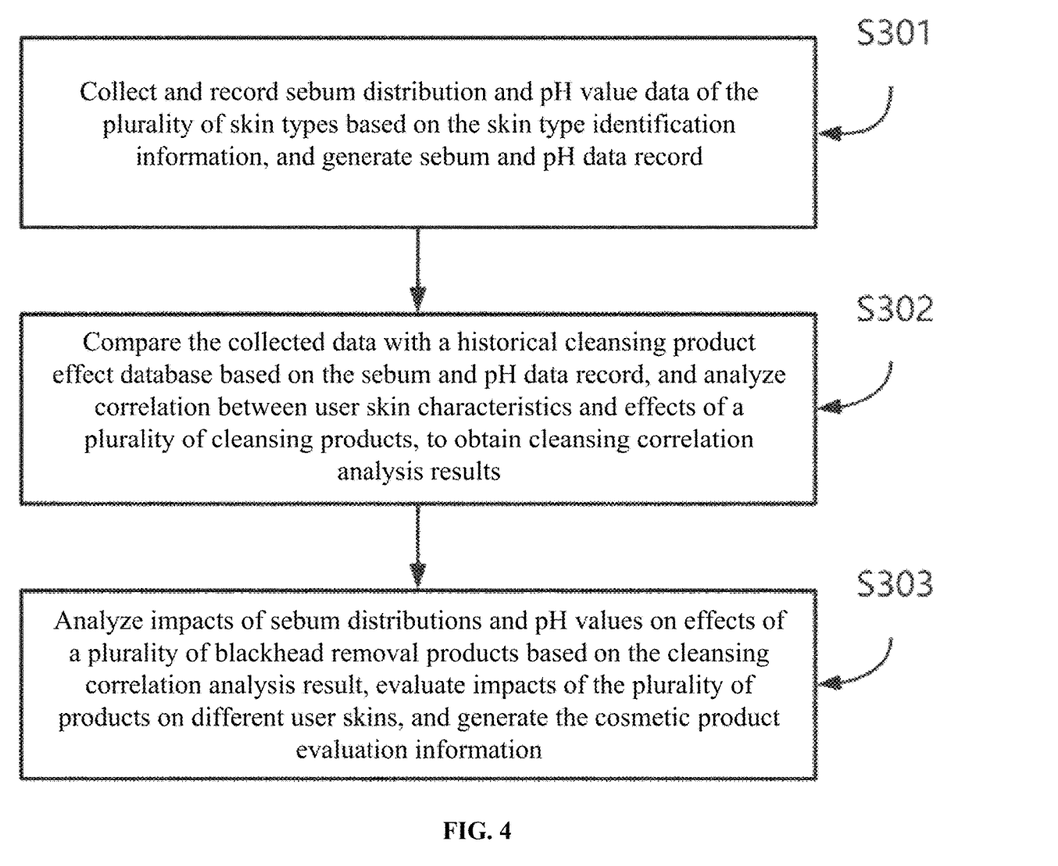
FIG. 4 is a detailed flowchart of S3 according to the present disclosure.

Referring to FIG. 4 the step of analyzing the sebum distributions and the pH values of the plurality of skin types based on the skin type identification information, classifying the skin types, and analyzing the correlation between the sebum distributions, the pH values and the historical cleansing product effects, to obtain the cosmetic product evaluation information specifically includes the following steps S301 to S303:

S301: Sebum distribution and pH value data of the plurality of skin types are collected and recorded based on the skin type identification information, and a sebum and pH data record are generated.

In the sub-step S301, sebum distributions and pH values of users with different skin types are determined by using a dedicated biosensor based on the skin type identification information, an automated collection protocol is set to precisely record sebum densities and skin surface pH values of different areas, formulas for data collection being $$D(x, y) = \frac{\sum_{i=1}^{n} S_i(x, y)}{n}$$

and $$pH(x, y) = \frac{\sum_{i=1}^{n} H_i(x, y)}{n},$$

where D(x,y) represents average sebum density at coordinates (x, y), $S_i(x, y)$ represents sebum density measured for an $i^{th}$ time, pH(x, y) represents an average pH value at coordinates (x, y), $H_i(x, y)$ represents a pH value measured for the $i^{th}$ time, and n represents a number of repeated measurements, to generate the sebum and pH data record.

S302: The collected data with a historical cleansing product effect database based on the sebum and pH data record is compared, and correlation between user skin characteristics and effects of a plurality of cleansing products is analyzed, to obtain cleansing correlation analysis results.

In the sub-step S302, the sebum and pH data record are inputted into a cleansing product effect analysis system and compared with the historical cleansing product effect database, sensitivity of various ingredients of blackhead removal products to characteristics of the target skins is identified through a multivariate correlation analysis method by using a correlation analysis formula $$R = \frac{\sum(X - \bar{X})(Y - \bar{Y})}{\sqrt{\sum(X - \bar{X})^2 \sum(Y - \bar{Y})^2}},$$

where R represents a correlation coefficient, X is a variable representing a cleansing product effect, Y is a variable representing a skin characteristic, and $\bar{X}$ and $\bar{Y}$ are respectively averages of the variables, and a statistical correlation between product ingredients and skin characteristics is determined, to obtain the cleansing correlation analysis results.

S303: Impact of sebum distributions and pH values on effects of a plurality of blackhead removal products is analyzed based on the cleansing correlation analysis results, impact of the plurality of products on different user skins is evaluated, and the cosmetic product evaluation information is generated as follows.

In the sub-step S303, the impact of the sebum distributions and the pH values on effects of a plurality of user face cleansing products is analyzed based on the cleansing correlation analysis results, a logistic regression model is established to evaluate effects of product ingredients on improving or worsening skin conditions, and possibilities that different skin types react to cleansing products are predicted through the logistic regression model by using a formula $$\log\left(\frac{p}{1 - p}\right) = \beta_0 + \beta_1 X_1 + \beta_2 X_2,$$

where p is a probability that the product effect is positive, $X_1$ is a sebum content, $X_2$ is a pH value, and $\beta_0$, $\beta_1$, and $\beta_2$ are model parameters, to generate the cosmetic product evaluation information.

Figure 5:
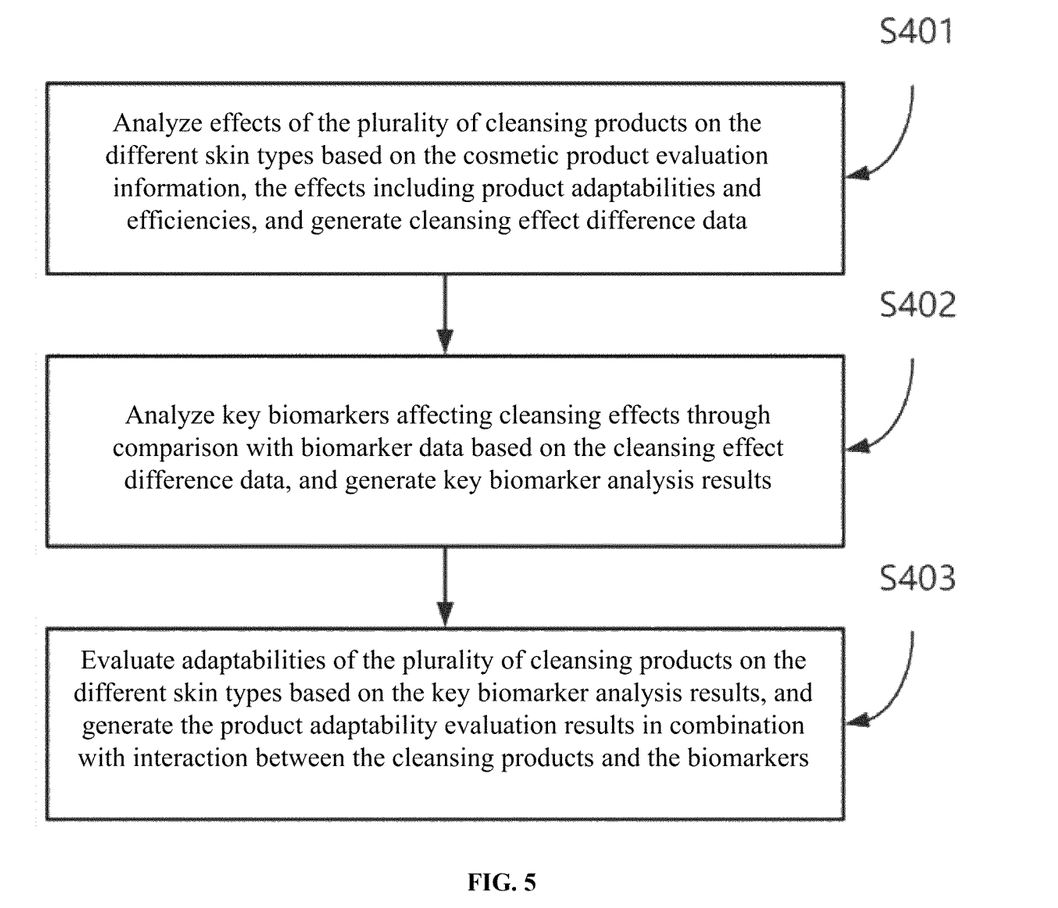
FIG. 5 is a detailed flowchart of S4 according to the present disclosure.

Referring to FIG. 5, the step of identifying the key factors affecting the cleansing effects based on the cosmetic product evaluation information, analyzing the correlation between the cleansing products and the biomarkers, identifying the performance of the plurality of cleansing products on different skin types, and generating the product adaptability evaluation results specifically includes the following steps S401 to S403:

S401: effects of the plurality of cleansing products on different skin types are analyzed based on the cosmetic product evaluation information, the effects including product adaptability and efficiency, and cleansing effect difference data is generated as follows.

In the sub-step S401, differences in reactions of different skin types after use of a plurality of cleansing products are analyzed based on the cosmetic product evaluation information by using a statistical analysis method, including variance analysis and effect size calculation, differences in cleansing effects are calculated in consideration of adaptability and treatment efficiency of a plurality of blackhead removal products by using a formula $$\text{Effect Size} = \frac{\mu_1 - \mu_2}{\sigma},$$

where $\mu_1$ and $\mu_2$ respectively represent average cleansing effects of the skin types after use of a target product, and $\sigma$ is an overall standard deviation, cleansing products that are more effective on the target skin types are identified, and the cleansing effect difference data is generated.

S402: Key biomarkers affecting cleansing effects are analyzed through comparison with biomarker data based on the cleansing effect difference data, and key biomarker analysis results are generated.

In the sub-step S402, the key biomarkers affecting the cleansing effects are identified based on the cleansing effect difference data through comparison with known biomarker data and through correlation and regression analysis by using a formula $$r = \frac{\sum(x_i - \bar{x})(y_i - \bar{y})}{\sqrt{\sum(x_i - \bar{x})^2 \sum(y_i - \bar{y})^2}},$$

where $x_i$ and $y_i$ respectively represent data points between expression levels of biomarkers and cleansing effects, and $\bar{x}$ and $\bar{y}$ are respectively averages thereof, correlation between cleansing effects and target biomarkers is determined, and the key biomarker analysis results are generated.

S403: Adaptabilities of a plurality of cleansing products on different skin types are evaluated based on the key biomarker analysis results, and the product adaptability evaluation results are generated in combination with interaction between the cleansing products and the biomarkers as follows.

In the sub-step S403, the adaptabilities of the plurality of cleansing products on different skin types are evaluated based on the key biomarker analysis results, the interaction between the cleansing products and the biomarkers is analyzed through multivariate linear regression by using a formula $Y=\beta_0+\beta_1X_1+\beta_2X_2+\ldots+\beta_nX_n$, where Y represents an adaptability score of a cleansing product, $X_1, X_2, \ldots, X_n$ represent expression levels of biomarkers, and $\beta_0, \beta_1, \ldots, \beta_n$ are regression coefficients, effects of the cleansing products on the target skin types are evaluated and predicted, and the product adaptability evaluation results are generated.

Figure 6:
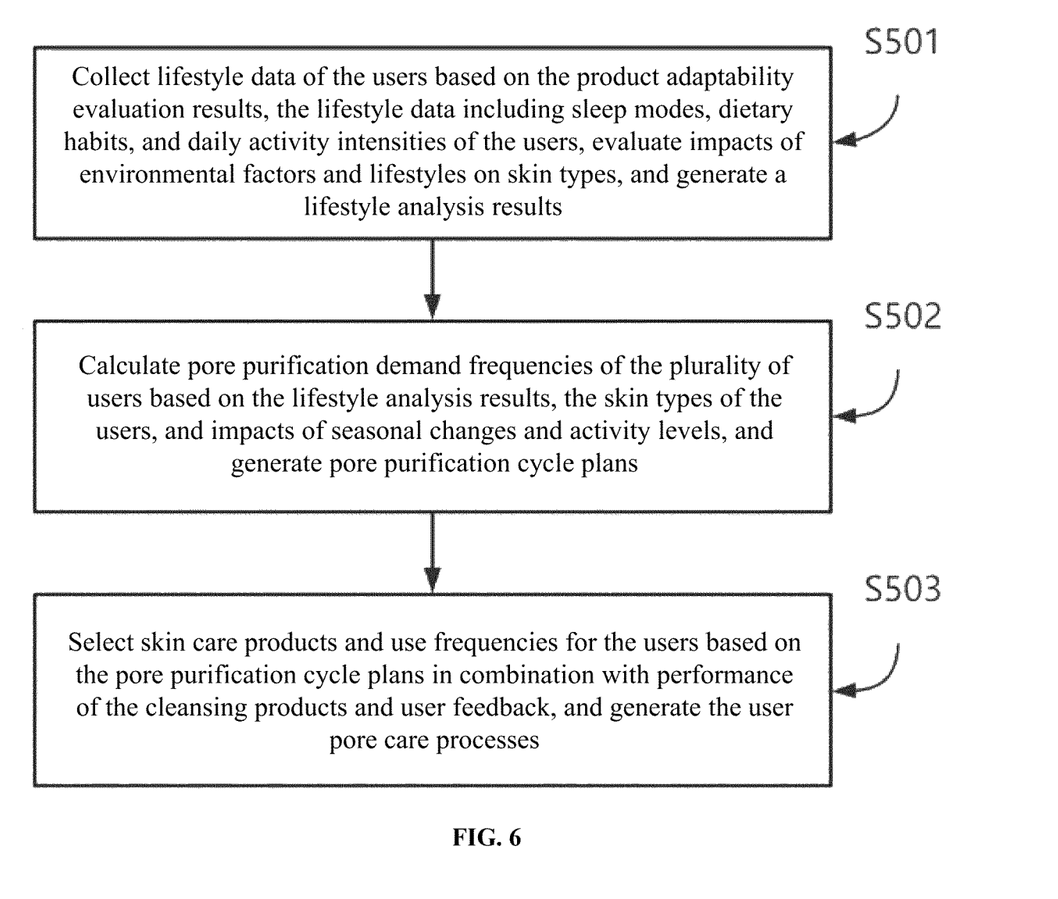
FIG. 6 is a detailed flowchart of S5 according to the present disclosure.

Referring to FIG. 6, the step of analyzing the lifestyles and the environmental factors of the users based on the product adaptability evaluation results, calculating the pore purification cycles of the plurality of users in combination with the skin types of the users, and generating the user pore care processes specifically includes the following steps S501 to S503.

S501: Lifestyle data of the users are collected based on the product adaptability evaluation results, the lifestyle data including sleep modes, dietary habits, and daily activity intensities of the users, impact of environmental factors and lifestyles on skin types is evaluated, and lifestyle analysis results are generated as follows.

In the sub-step S501, the sleep modes, the dietary habits, and the daily activity intensity data of the users are systematically collected through a configured online survey and mobile application tracking tools based on the product adaptability evaluation results, the impact of the environmental factors and the lifestyles on a plurality of skin types is evaluated by using a regression analysis model, impact of lifestyles on skin health is determined through the regression model by using a formula Skin Health=$\alpha+\beta_1$Sleep+$\beta_2$Diet+$\beta_3$Activity+$\epsilon$, where Skin Health indicates a skin health condition, Sleep, Diet, and Activity respectively represent quantitative indexes of a sleep mode, a dietary habit, and an activity intensity, $\alpha$ and $\beta$ are coefficients, and $\epsilon$ is an error term, and the lifestyle analysis results are generated.

S502: Pore purification demand frequencies of the plurality of users are calculated based on the lifestyle analysis results, the skin types of the users, and impact of seasonal changes and activity levels, and pore purification cycle plans are generated as follows.

In the sub-step S502, the pore purification demand frequencies of the users are determined through analysis on the skin type data, the seasonal changes, and the activity levels of the users based on the lifestyle analysis results by using a decision-making tree, the decision-making tree model taking impact of various factors on skin pore clogging, to customize a pore purification cycle for each user, and calculate pore purification frequencies by using a formula $$F = \frac{1}{D_s + D_w \cdot W + D_a \cdot A},$$

where F represents a purification frequency, $D_s$ is a seasonal impact factor, $D_w$ is a work or activity level impact factor, W is an actual work intensity, $D_a$ is an adjustment factor corresponding to a skin type, and A is an activity level index, proper pore purification cycles are set based on various variables, and the pore purification cycle planes are generated.

S503: Skin care products and use frequencies for the users based on the pore purification cycle planes in combination with performance of the cleansing products and user feedbacks are selected, and the user pore care processes are generated as follows.

In the sub-step S503, a suitable skin care product and a use frequency are recommended for each user by using a matching algorithm based on the pore purification cycle planes in combination with performance evaluation and user feedbacks of cleansing products available on the market, product matching degrees are calculated based on adaptabilities of product ingredients, user skin sensitivities, and historical use feedbacks by using a formula $$M = \sum_{i=1}^{n}(P_i \cdot U_i),$$

where M represents a matching degree score, $P_i$ is a matching degree score of a product i, and $U_i$ is a preference of a user for the product i, suggestions on skin care are provided to enhance user experience, and the user pore care processes are generated.

Figure 7:
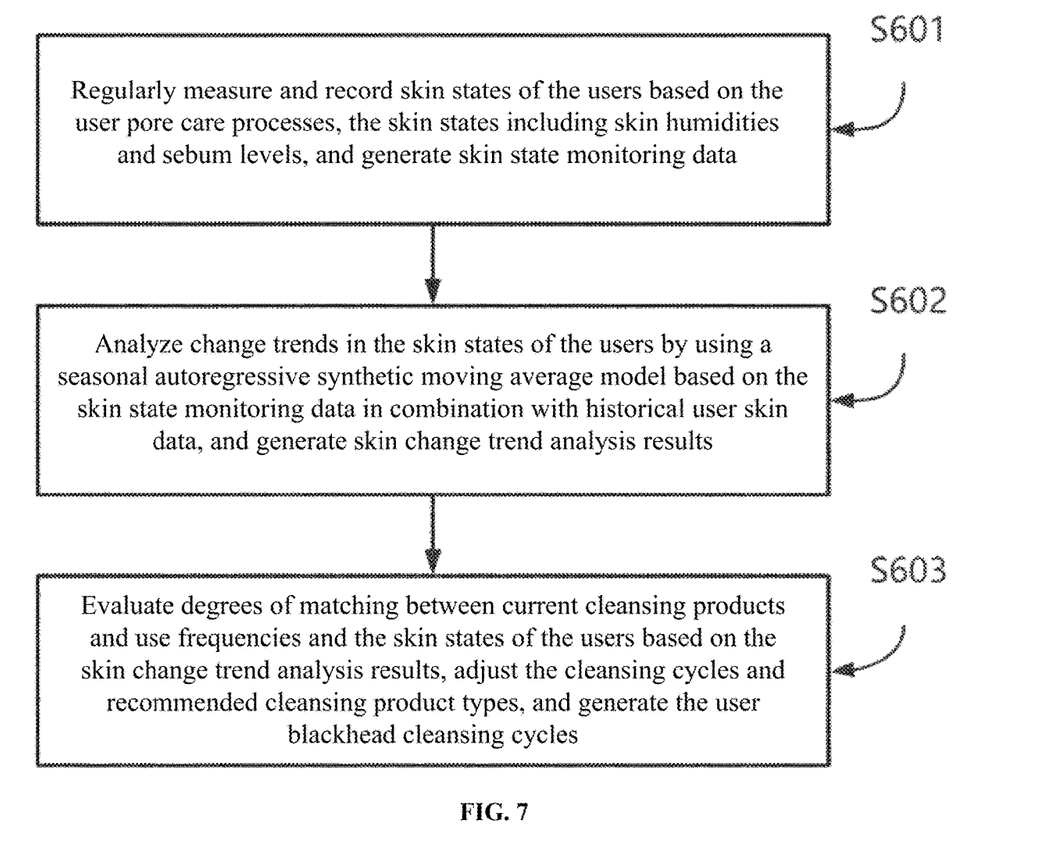
FIG. 7 is a detailed flowchart of S6 according to the present disclosure.

Referring to FIG. 7, the step of collecting the real-time skin state data of the users based on the user pore care processes, adjusting the selected cleansing products and the use frequencies, and generating the user blackhead cleansing cycles specifically includes the following steps S601 to S603:

S601: Skin states of the users, including skin humidities and sebum levels, are regularly measured and recorded based on the user pore care processes, and skin state monitoring data is generated as follows.

In the sub-step S601, the skin humidities and the sebum levels the users are regularly measured by using a high-precision skin sensor based on the user pore care processes, to ensure consistency and accuracy of data, the measured data is processed and recorded by using a formula $$H(t) = \text{average}(\{H_i(t)\}_{i=1}^n) \quad O(t) = \text{average}(\{O_i(t)\}_{i=1}^n),$$

where $H(t)$ and $O(t)$ respectively represent an average skin humidity and an average sebum level at a time t, and $H_i(t)$ and $O_i(t)$ are respectively a single reading measured for an $i^{th}$ time, instant changes in the skin states are tracked, and the skin state monitoring data is generated.

S602: Change trends in the skin states of the users are analyzed by using a seasonal autoregressive synthetic moving average model based on the skin state monitoring data in combination with historical user skin data, and skin change trend analysis results are generated;

In the sub-step S602, long-term and seasonal change trends in the skin states are identified and predicted by using a seasonal autoregressive synthetic moving average model based on the skin state monitoring data in combination with the historical user skin data, seasonal and non-seasonal impact factors are extracted from the data, sebum and humidity change trends on the skin surfaces of the users are analyzed, and the skin change trend analysis results are generated.

The seasonal autoregressive synthetic moving average model calculates the change trends in the skin states of the users based on the following formula:

$$X_t = c + \epsilon_t + \sum_{i=1}^{p} \phi_i X_{t-i} + \sum_{I=1}^{q} \theta_I \epsilon_{t-I} + S_t + H_t + E_t,$$

where t is a current time point, i is a time interval before the current time t, I is a time interval for indexing of a past error term, t-i indicates a historical time point traced back from the current time t by i time units in an autoregressive part, t-I indicates a historical error time point traced back from the current time t by I time units in a moving average part, $X_t$ is a skin state at the time t, which represents a target variable that needs to be predicted or analyzed, c is a constant term, which represents an offset or baseline level in the model, and does not change over time, $\epsilon_t$ is a white noise error term at the time t, which represents a random fluctuation or error at the time t, and is used to capture a random change in the model that is not explained, p is an order of the autoregressive part, which represents a number of values of $X_t$ in past p cycles used in the autoregressive model, $\phi_i$ is an $i^{th}$ autoregressive coefficient, which represents a linear dependency between $X_t$ and a value $X_{t-i}$ of a past $i^{th}$ cycle thereof, $X_{t-i}$ is a skin state at the time t-i, which represents a relationship between the current state $X_t$ and a state in a past $i^{th}$ cycle, q is an order of the moving average part, which represents a number of error terms of $\epsilon_t$ in past q cycles used in the moving average model, $\theta_I$ is an $I^{th}$ moving average coefficient, which represents a linear dependency between the error term $\epsilon_t$ and an error term $\epsilon_{t-I}$ in a past $I^{th}$ cycle, $\epsilon_{t-I}$ is a white noise error term at a time t-I, which represents a random error or fluctuation in past I cycles, $S_t$ is a seasonal adjustment factor at the time t, which is used to adjust the model to reflect impact of seasonal changes on a skin state, $H_t$ is a skin humidity index at the time t, which is used to measure and adjust impact of a humidity factor on a skin state, and $E_t$ is impact of an external environmental factor at the time t, specifically involving impact of climate, weather, or other environmental conditions on a skin state.

A specific execution process of the formula is as follows:

A time sequence model is created in combination with real-time monitoring data of a skin state and historical data of a user. Parameter settings of the model include determining the order p of the autoregressive part and the order q of the moving average part, which represents a number of historical cycles of the skin state data that the model takes into consideration to predict a current state. A prediction error is minimized to estimate the autoregressive coefficients $\phi_i$ and the moving average coefficient $\theta_I$, and the seasonal adjustment factor $S_t$ is added to adjust the prediction based on historical data patterns within the same season, to ensure that impact of seasonal changes is taken into consideration. The model combines an external environmental factor $E_t$ and a skin humidity index $H_t$, and makes adjustments based on current environmental monitoring data, to reflect changes in the skin state under various environmental conditions, so as to calculate the trend of changes in the skin state of the user.

S603: Degrees of matching between current cleansing products and use frequencies and the skin states of the users are evaluated based on the skin change trend analysis results, the cleansing cycles and recommended cleansing product types are adjusted, and the user blackhead cleansing cycles are generated as follows.

In the sub-step S603, adaptability of the current cleansing products and the use frequencies to the skin states of the users is evaluated based on the skin change trend analysis results, relationships between use frequencies and product types and skin state changes are analyzed, the cleansing cycles and the product types are adjusted by using a decision-making model to improve treatment outcomes and user satisfaction. The adaptability is calculated by using a formula $$C = \sum_{j=1}^{m} w_j \cdot x_j,$$

where C represents a total adaptability score, $x_j$ is a performance value of a $j^{th}$ factor, and $w_j$ is a weight of the factor, and the user blackhead cleansing cycles are generated.

Figure 8:
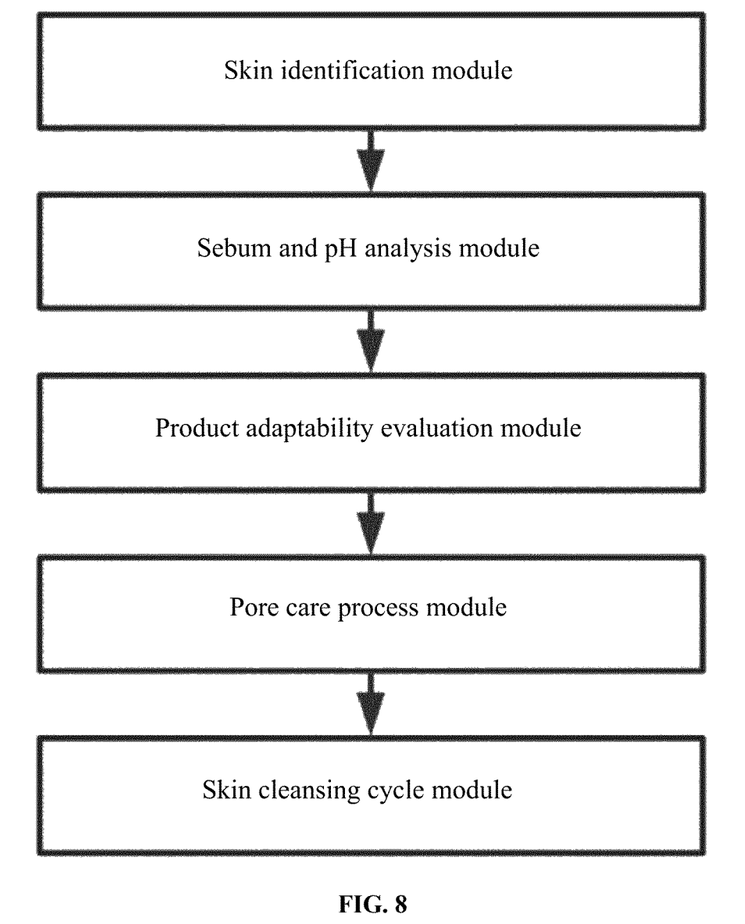
FIG. 8 is a flowchart of a system according to the present disclosure.

Referring to FIG. 8, a targeted control system for blackhead removal is provided, which is configured to perform the above targeted control method for blackhead removal. The system includes:

a skin identification module, configured to collect spectral response data of skin surfaces of users based on a spectral imaging technology, and analyze sebum contents and pore states, and identify skin types of the users, to obtain user skin property analysis results;

a sebum and pH analysis module, configured to analyze sebum distributions and pH values of a plurality of skins based on the user skin property analysis results, classify skin types of a plurality of users, evaluate correlation between sebum distribution, pH values and historical effects of a plurality of products, and generate cleansing effect analysis results;

a product adaptability evaluation module, configured to identify key factors affecting cleansing effects based on the cleansing effect analysis results, analyze correlation between cleansing products and biomarkers, identify performance of a plurality of cleansing products on different skin types, and obtain product effect adaptability indexes;

a pore care process module, configured to analyze lifestyles of the users and environmental factors based on the product effect adaptability indexes, calculate pore purification cycles in combination with the skin types of the users, and generate skin pore cleansing processes; and a skin cleansing cycle module, configured to collect real-time skin state data of the users based on the skin pore cleansing processes, adjust selected cleansing products and use frequencies, and generate user blackhead cleansing cycles.

The above is merely the preferred embodiments of the present disclosure, and do not limit the present disclosure in any other form. Any person skilled in the art may use the technical content disclosed above to make changes or modifications to obtain equivalent embodiments to be applied to other fields. However, any simple modifications, equivalent changes, and modifications made to the above embodiments based on the technical essence of the present disclosure without departing from the technical solution of the present disclosure still fall within the protection scope of the technical solution of the present disclosure.

What is claimed is:

1. A targeted control method for blackhead removal, comprising:

collecting spectral response data of skin surfaces of users by a spectrometer based on a spectral imaging technology; and by a processor, analyzing sebum contents and pore states, identifying skin areas with blackheads and clogged pores, and obtaining spectral data analysis results;

by the processor, analyzing skin and pore states of a plurality of users based on the spectral data analysis results, identifying skin types of target users, and generating skin type identification information;
  wherein the step of analyzing the skin and pore states of the plurality of users based on the spectral data analysis result, identifying the skin types of the target users, and generating the skin type identification information comprises:
    analyzing sebum levels and pore states of the skin surfaces of the users based on the spectral data analysis result, and grouping skin types of the plurality of users, to obtain skin characteristic classification data;
    performing matching degree analysis based on the skin characteristic classification data and historical skin data information, and identifying the skin types of the target users, to obtain user skin matching results; and
    analyzing the skin types of the plurality of users by using the user skin matching results, identifying key characteristics of the skin types of the users, the key characteristics comprising a sebum content indicator, moisture retention capability, and a spectral reflectance characteristic, and generating the skin type identification information;

by the processor, analyzing sebum distributions and pH values of a plurality of skin types based on the skin type identification information, and analyzing correlation between the sebum distributions, the pH values and historical cleansing product effects, to obtain cosmetic product evaluation information;

by the processor, identifying key factors affecting cleansing effects based on the cosmetic product evaluation information, analyzing correlation between cleansing products and biomarkers, identifying performance of a plurality of cleansing products on different skin types, and generating product adaptability evaluation results;

by the processor, analyzing lifestyles and environmental factors of the users based on the product adaptability evaluation results, calculating pore purification cycles of the plurality of users in combination with the skin types of the users, and generating user pore care processes;

by the processor, collecting real-time skin state data of the users based on the user pore care processes, adjusting selected cleansing products and use frequencies, and generating user blackhead cleansing cycles;
  wherein the step of collecting the real-time skin state data of the users based on the user pore care processes, adjusting the selected cleansing products and the use frequencies, and generating the user blackhead cleansing cycles comprises:
    regularly measuring and recording skin states of the users based on the user pore care processes, the skin states comprising skin humidities and sebum levels, and generating skin state monitoring data;
    analyzing change trends in the skin states of the users by using a seasonal autoregressive synthetic moving average model based on the skin state monitoring data in combination with historical user skin data, and generating skin change trend analysis results; and
    evaluating degrees of matching between current cleansing products and use frequencies and the skin states of the users based on the skin change trend analysis results, adjusting cleansing cycles and recommended cleansing product types, and generating the user blackhead cleansing cycles, wherein the user blackhead cleansing cycles comprise a cleansing frequency adjusted based on skin state changes, suggestions on product replacement, and blackhead prevention measures; and removing sebum and keratinous clogged in pores of the users according to the user blackhead cleansing cycles.

2. The targeted control method for blackhead removal according to claim 1, wherein the spectral data analysis results comprise sebum profiles, pore state indexes, and blackhead distribution areas; the skin type identification information comprises water and sebum balance information, elasticity rating scores, and comprehensive sensitivity evaluation results of user skins; the cosmetic product evaluation information comprises sebum distribution data corresponding to the plurality of skin types, pH value information corresponding to the plurality of skin types, and cleansing product reaction correlation analysis results; the product adaptability evaluation results comprise effect comparisons of skin types corresponding to a plurality of products, cleansing effects at various pH values, and correlation analysis results of products and sebum distributions; and the user pore care processes comprise a regular deep cleansing schedule, recommended skin care products and suggestions on environmental factor adjustment.

3. The targeted control method for blackhead removal according to claim 1, wherein the step of collecting the spectral response data of the skin surfaces of the users by the spectrometer based on the spectral imaging technology; and by a processor, analyzing the sebum contents and the pore states, identifying the skin areas with blackheads and clogged pores, and obtaining the spectral data analysis results comprises:
  collecting the spectral response data of the skin surfaces of the users based on the spectral imaging technology, recording spectral intensities and wavelength changes, and generating the spectral response data;
  identifying spectral bands representing the sebum contents and the pore states based on the spectral response data, and analyzing and recording peak intensities and peak wave widths of target wavebands, to obtain sebum and pore characteristic data; and
  identifying, from the sebum and pore characteristic data, areas with sebum accumulation and pore expansion and blackhead locations of skins through comparison of user skin spectral characteristics, and generating the spectral data analysis results.

4. The targeted control method for blackhead removal according to claim 1, wherein the step of analyzing the sebum distributions and the pH values of the plurality of skin types based on the skin type identification information, and analyzing the correlation between the sebum distribution, the pH values and the historical cleansing product effects, to obtain the cosmetic product evaluation information comprises:
  collecting and recording sebum distribution and pH value data of the plurality of skin types based on the skin type identification information, and generating sebum and pH data record;
  comparing the collected sebum and pH data with a historical cleansing product effect database based on the sebum and pH data record, and analyzing correlation between user skin characteristics and effects of a plurality of cleansing products, to obtain cleansing correlation analysis results; and
  analyzing impact of sebum distributions and pH values on effects of a plurality of blackhead removal products based on the cleansing correlation analysis result, evaluating impact of the plurality of products on different user skins, and generating the cosmetic product evaluation information.

5. The targeted control method for blackhead removal according to claim 1, wherein the step of identifying the key factors affecting the cleansing effects based on the cosmetic product evaluation information, analyzing the correlation between the cleansing products and the biomarkers, identifying the performance of the plurality of cleansing products on the different skin types, and generating the product adaptability evaluation result comprises:
  analyzing effects of the plurality of cleansing products on the different skin types based on the cosmetic product evaluation information, the effects comprising product adaptability and efficiency, and generating cleansing effect difference data;
  analyzing key biomarkers affecting cleansing effects through comparison with biomarker data based on the cleansing effect difference data, and generating key biomarker analysis results; and
  evaluating adaptabilities of the plurality of cleansing products on the different skin types based on the key biomarker analysis results, and generating the product adaptability evaluation results in combination with interaction between the cleansing products and the biomarkers.

6. The targeted control method for blackhead removal according to claim 1, wherein the step of analyzing the lifestyles and the environmental factors of the users based on the product adaptability evaluation result, calculating the pore purification cycles of the plurality of users in combination with the skin types of the users, and generating the user pore care processes comprises:
  collecting lifestyle data of the users based on the product adaptability evaluation results, the lifestyle data comprising sleep modes, dietary habits, and daily activity intensities of the users, evaluating impact of environmental factors and lifestyles on skin types, and generating lifestyle analysis results;
  calculating pore purification demand frequencies of the plurality of users based on the lifestyle analysis results, the skin types of the users, and impact of seasonal changes and activity levels, and generating pore purification cycle plans; and
  selecting skin care products and use frequencies for the users based on the pore purification cycle plans in combination with performance of the cleansing products and user feedbacks, and generating the user pore care processes.

7. The targeted control method for blackhead removal according to claim 1, wherein
  the seasonal autoregressive synthetic moving average model calculates the change trends in the skin states of the users based on a following formula:

$$X_t = c + \epsilon_t + \sum_{i=1}^{p} \phi_i X_{t-i} + \sum_{I=1}^{q} \theta_I \epsilon_{t-I} + S_t + H_t + E_t,$$

wherein t is a current time point, i is a time interval before the current time t, I is a time interval for indexing of a past error term, t-i indicates a historical time point traced back from the current time t by i time units in an autoregressive part, t-I indicates a historical error time point traced back from the current time t by I time units in a moving average part, $X_t$ is a skin state at the time t, c is a constant term, $\epsilon_t$ is a white noise error term at the time t, p is an order of the autoregressive part, $\phi_i$ is an $i^{th}$ autoregressive coefficient, $X_{t-i}$ is a skin state at the time t-i, q is an order of the moving average part, $\theta_I$ is an $I^{th}$ moving average coefficient, $\epsilon_{t-I}$ is a white noise error term at the time t-I, $S_t$ is a seasonal adjustment factor at the time t, $H_t$ is a skin humidity index at the time t, and $E_t$ is impact of an external environmental factor at the time t.

8. A targeted control system for blackhead removal, applied to the targeted control method for blackhead removal according to claim 1, comprising:

the spectrometer, configured to: collect the spectral response data of the skin surfaces of the users based on the spectral imaging technology; and the processor, configured to:

analyze the sebum contents and the pore states, identify the skin areas with the blackheads and the clogged pores, analyze the skin and the pore states of the plurality of users based on the spectral data analysis results, identify the skin types of the target users, and generate the skin type identification information;

analyze the sebum distributions and the pH values of the plurality of skin types based on the skin type identification information, evaluate the correlation between the sebum distributions, the pH values and the historical cleansing product effects, and generate the cosmetic product evaluation information;

identify the key factors affecting the cleansing effects based on the cosmetic product evaluation information, analyze the correlation between the cleansing products and the biomarkers, and identify the performance of the plurality of cleansing products on the different skin types, to obtain the product adaptability evaluation results;

analyze the lifestyles and the environmental factors of the users based on the product adaptability evaluation results, calculate the pore purification cycles in combination with the skin types of the users, and generate the user pore care processes; and collect the real-time skin state data of the users based on the user pore care processes, adjust the selected cleansing products and the use frequencies, and generate the user blackhead cleansing cycles, to remove sebum and keratinous clogged in pores of the users according to the user blackhead cleansing cycles.

* * * * *